May 18, 1943     W. LEATHERS     2,319,412
AUTOMATIC METER READING APPARATUS
Filed Oct. 18, 1940     5 Sheets-Sheet 1

INVENTOR.
Ward Leathers

May 18, 1943.  W. LEATHERS  2,319,412
AUTOMATIC METER READING APPARATUS
Filed Oct. 18, 1940   5 Sheets-Sheet 4

Fig. 9.

Patented May 18, 1943

2,319,412

UNITED STATES PATENT OFFICE 2,319,412

AUTOMATIC METER-READING APPARATUS

Ward Leathers, Brooklyn, N. Y., assignor, by mesne assignments, to International Business Machines Corporation Application October 18, 1940, Serial No. 361,802

16 Claims. (Cl. 234—1.5)

The present invention pertains to the type of central station meter-reading system wherein the meters to be read are joined to the central station by means of a skeletonized wire system comprising essentially a conductor from central station to a primary selector or distributing point remote from the central station, a conductor from said distributor to a local distributor still more remote from central station, and finally, a conductor from local distributor to meter. Such systems are illustrated and described in my prior Patent No. 2,283,071, dated May 12, 1942.

An object of the present invention is to provide the simplest and least expensive mechanism for application to present-day meters whereby they may be read over the aforementioned wire system.

A further object is to put as much of the mechanism as possible, which pertains to all the meters joined each by a conductor or circuit to the said local distributor, within the local distributor itself. Thus this mechanism may be kept under closer supervision and much of it may function as often as there are meters joined to said distributor where with the same mechanism in the meter it would require duplication to the same number.

A very distinct object of this system also is to read the registered number of consumed units direct from the meter by means of a single electrical resistance proportionate to the said number and then electrically break down that amount to a desirable number of digits, preferably three, at the central station and then record the same in a suitable manner such as by code perforations in a tape.

Another object of the invention is to identify the meter being read and recorded by identification means disposed within the local selector which indeed enables the mechanism at the central reading station to determine and record the number of the conductor and thereby the number of the meter joined to the said local selector and being read at that time.

Another object of the present invention is to provide all those complex means whereby the above described system of meter-reading may be considered to function automatically and serially for the purpose of reading large numbers of meters in suitable manner as by on a code perforated tape.

A further object is to check at the central station the number of the meter being read as it is being read against a counter register indicating the number of the meter that should be being read.

Another object of the invention is to cause identification numerals representing a selector to be recorded in conjunction with the numerals representing the numbers of the individual meters associated with the selector.

Another object is to automatically equalize the progression of resistance to the progression of voltage in spite of the normal unequal progression due to series resistance.

Another object is to automatically check the numbers of meters and selectors against fixed serials of numbers and cause the reading and recording mechanisms to stop when they do not agree.

In order to set forth my invention I have prepared this specification, to which I have appended drawings, of which.

Figure 1:
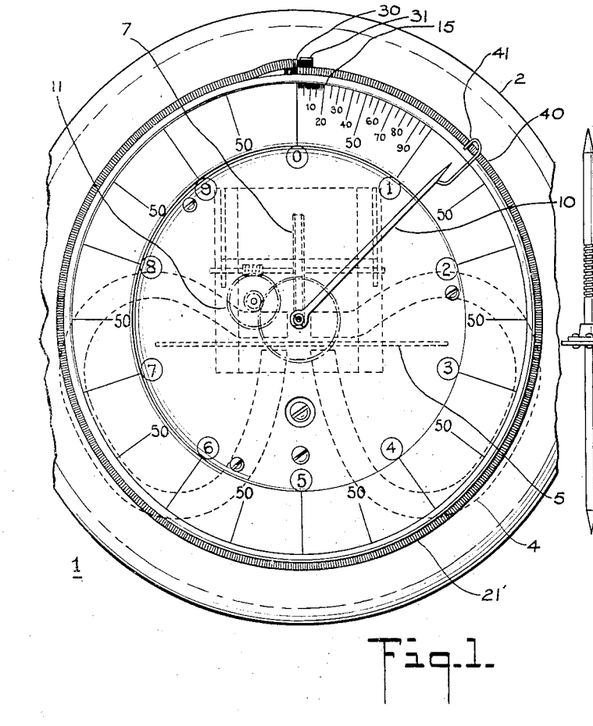
Figure 1 is a partial front view of a consumer's watt-hour meter incorporating this invention.
Figure 2:
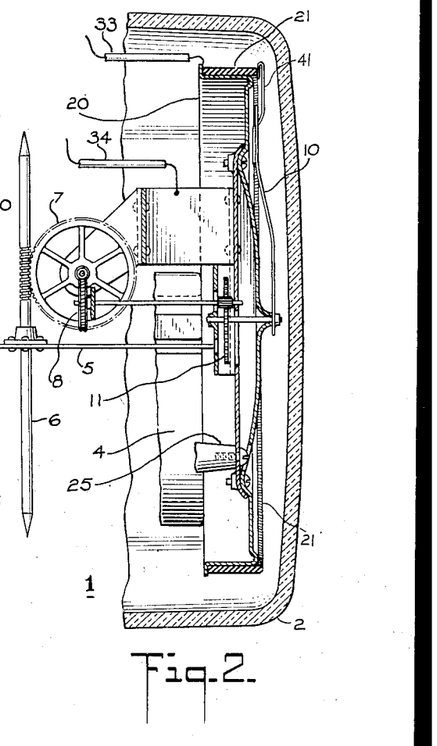
Figure 2 is a partial vertical cross-sectional view of the same.

A meter, generally characterized by the numeral 1, Figures 1 and 2, is covered by a glass case 2. Within the meter are found the usual magnets 4, consumed current measuring disc 5 supported on the usual vertical spindle 6 driving a worm and worm-gear 7 which gear drives worm and worm-gear 8 which in turn drives a recording needle 10 by means of a spur and spur-gear 11. This gear train is of such ratio that the recording finger on needle 10 rotates one-thousanth part of one revolution per k. w. h. consumed. In meters for gas or other consumed commodity the needle rotations may the same for one unit thereof. On a dial 15 one thousand divisions may be etched or lithographed or otherwise clearly marked in such manner that the consumer may, when so minded, read the meter. This indexing is on the face of a pan or shell-like aluminum stamping 20 which is so provided with an outer flange that a strip of insulation material 21 holding a winding of resistance wire (constituting a wire-wound resistor 21') may be placed thereon and thus supported. The stamping 20 is joined to the meter in any suitable manner as by screws and posts 25, the post being a part of the frame of the meter and being disposed as desired or required. Other structural parts may be joined to the part 20 as indicated in the drawings and furnishing support for the gear train above described. When the part 20, holding as it does all the assembly of the recording mechanism, is removed from the meter frame as by the removal of screws at 26 the entire recording unit comes with it. This is in accordance with conventional practice wherein dial recorders and so-called cyclometers or stepping numeral indicators are placed in present-day meters in similar manner, i. e. with the correct juncture for driving being thereby made between the gear 7 and the shaft 6 whether it be worm and worm-gear or spur and spur-gear drive.

Figure 3:
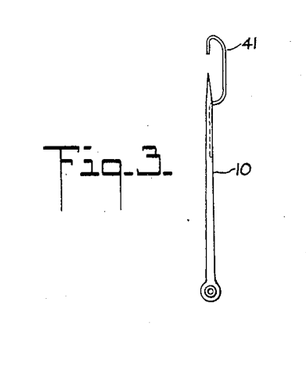
Figure 3 is a detail elevational view of an electrified indicating needle for the local and remote reading mechanism of Figures 1 and 2.

The insulation strip 21 which may well be of flexible, hard-fibre, Bakelite or other suitable flexible material of high di-electric value, is wound while still in a straight strip with a fine resistance wire. The characteristics of the wire are such that when a continuous winding is made of sufficient length to furnish exactly one full revolution when placed on the part 20, the total resistance will be substantially exactly equal to a predetermined ohmage. In manufacture, these strips, before being bent to circular form, should be calibrated to very considerable electrical exactitude for resistance value and mechanical exactitude for length of wound strip. The two ends of the coil are placed in juxtaposition at 30 but not in electrical contact with each other and the ends held in any suitable manner as by a clip 31. The resistance wire of this coil is very perfectly enameled and one end is electrically joined to and anchored in the part 20 and the other end is connected to a conductor 33. The part 20 is then electrically joined to a conductor 34. After the coil is made and placed on the part 20 the top of the coil is accurately and delicately ground on a flat grinder making a series of electrical contacts along the top face at 40 upon which slides a delicate hair-spring wire 41, preferably formed of platinum, carried on the indicating needle 10. An electrical circuit is thereby provided from the conductor 33 through that portion of the coil starting with zero index all the way to the point of contact with the platinum wire 41 over the said wire, the indicating needle, the framework of the mechanism and the return wire 34. It is by means of this circuit that the meter is read.

Figure 4:
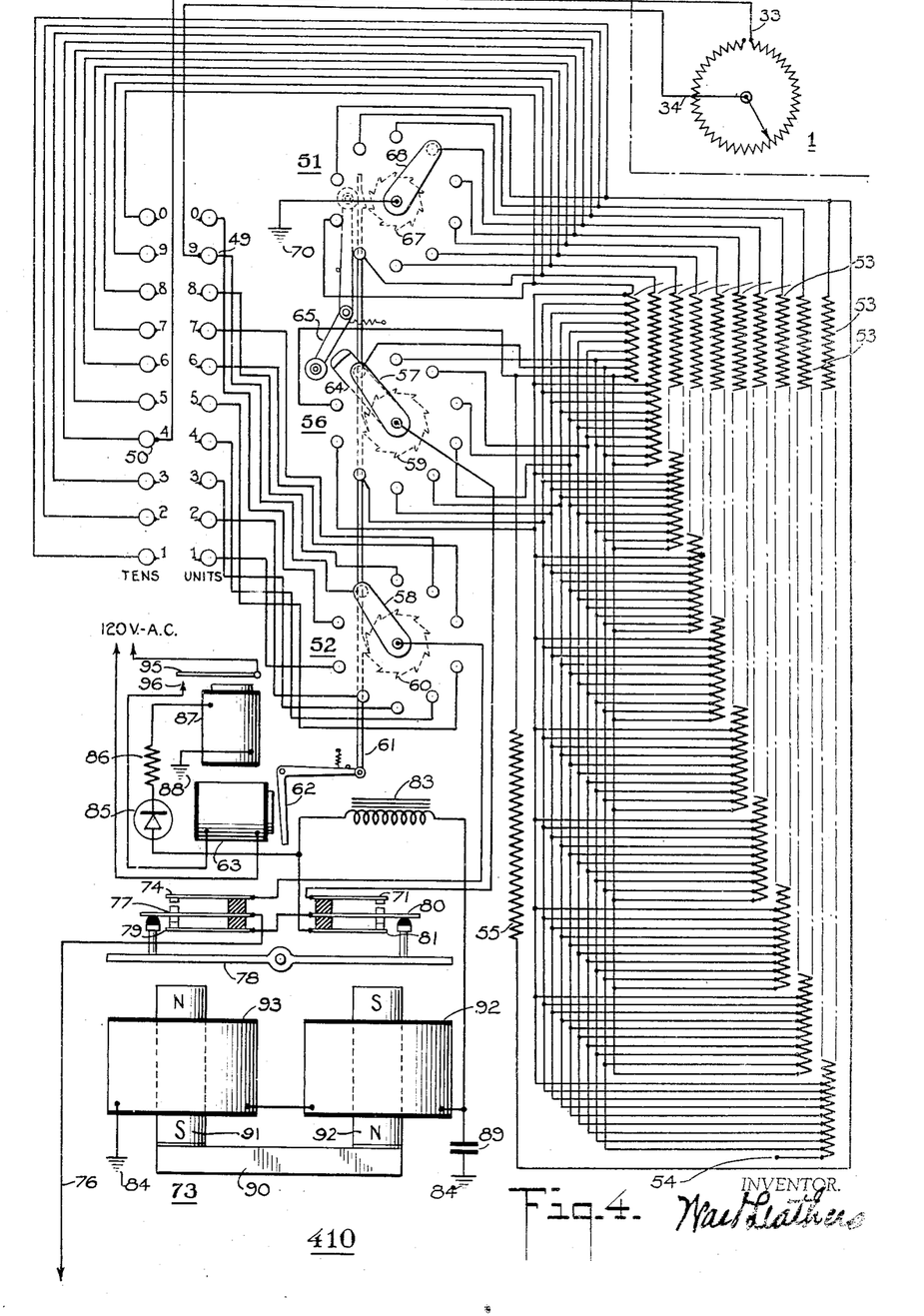
Figure 4 is a diagrammatic view of the local selector and the meter.

The two conductors, 33 and 34, are brought to two terminals, 49 and 50, in a secondary selector 410, as shown in Figure 4, each conductor being thus electrically joined to one of a series of ten terminals. One series represents a tens digit and the other series represents a units digit of an identifying number, the number being any one of one-hunderd numbers (00 to 99) representing and joined to one-hundred meters in similar manner to meter 1. Thus if the number is 52, it is electrically connected to the 5th terminal in the tens column and the 2nd terminal in the units column. The number of the meter illustrated in Figure 4 is 49. The tens terminals in the tens column are electrically joined to ten corresponding terminals on an automatic switch generally characterized by the numeral 51. The ten terminals in the units column are electrically joined to ten corresponding terminals on an automatic switch generally characterized by the numeral 52. Before reading a meter, precautions should be taken to make sure of the identity of that meter. Therefore, in the secondary selector 410, there is a predetermined value of resistance obtained by tapping one of ten bleeder resistors 53 for each meter that is wired to the secondary selector. The resistance of each tap corresponds to the number of the meter it identifies and is read in exactly the same manner as the registered consumption in the meter. Each of the ten bleeders 53 is tapped ten times, each tap of resistance 53 beginning just one increment ahead of where the last tap of the preceding resistance is left off, to provide in effect one-hundred resistances of equally increasing values. Each corresponding tap is electrically connected together, all the numbers one, two, three, etc., taps are connected together. It is evident that ordinarily there should be one-hundred taps in all; however, there are only ninety-nine taps. In place of the one-hundredth tap 54 is a resistor 55; i. e. the one-hundredth tap is non-existant and the whole long resistance is superseded by resistor 55. The resistor 55 is electrically connected into the circuit just as though it were the one-hundredth tap. This resistor is used to identify the secondary selector itself and displaces or takes the place of a meter. The common wires of each of the ten bleeder resistors 53 are connected to the corresponding terminals on the automatic switch 51. The ninety-nine taps and resistor 55 are connected together so that there are only ten wires leading from the bleeders. These ten wires are connected to corresponding terminals on an automatic switch generally characterized by the number 56. Contactor arms 57 and 58 on switches 56 and 52 respectively are advanced by means of ratchets 59 and 60, and a multiple pawl member 61 driven by an armature 62 which is attracted when a coil 63 is energized. On the switch 56 is a projection 64 which advances with arm 57. Every tenth time the arm 57 is advanced, the projection 64 moves a lever 65 causing it to force the pawl 61 into engagement with ratchet 67 on the switch 51. When the apparatus is in this position and coil 63 energized the pawl 61 advances arms 57 and 58 and 68. When the coil 63 is energized and the projection 64 does not move the lever 65 causing pawl 61 to engage the ratchet 67, then only the arms 57 and 58 are advanced. Therefore, the arm 68 on switch 51 is advanced once for every ten times the arms 57 and 58 on switches 56 and 52 respectively are advanced. It is in this manner that one-hundred circuits may be individually, selectively and progressively closed by two ten-position switches. The arm 68 on switch 51 is grounded at 70. The arm 57 on switch 56 is electrically connected to a contact 71 on a polarized relay generally characterized by the numeral 73. The arm 58 on switch 52 is electrically connected to a contact 74 on the relay 73. A line 76 from the primary selector 411 and central reading station timer 412 (see also Figure 5) is electrically connected to a contact 77. In the normal position of an armature 78 on the relay 73 the contact 77 touches a contact 79 which is electrically wired to a contact 80. The contact 80 touches a contact 81 which is electrically connected to the relay 73 through an inductance 83 and thence to a ground 84. The contact 81 is also electrically connected to a copper-oxide rectifier 85, thence to a resistor 86 and a relay 87 to a ground 88. A condensor 89 is shunted across the polarized relay 73. The condensor 89 stores up electrical energy when the relay 73 is energized, and releases the energy after the relay 73 ceases to receive energy from the first source. Therefore, the relay 73 will remain energized and hold the armature 78 in one of two positions even after the relay has been cut off from a source of electrical current. The inductance or choke 83 prevents any form of alternating current from reaching the relay 73 from the line 76. However, the relay 73 may be energized by any polarity of constant direct current because the choke 83 does not affect constant direct current. A bar 90 made from any non-magnetic metal, such as brass or copper, is used to mechanically hold two permanent magnets 91 and 92 in a horseshoe shape yet prevent them from forming a horseshoe magnet. When a direct current is sent through the relay 73 from the central reading station over line 76 through contacts 77, 79, 80, 81 and choke 83 to the relay 73 and ground 84, a coil 92 will gain in magnetic attraction and a coil 93 lose in magnetic attraction. This causes the armature 78 to rotate clockwise making contact 77 touch contact 74 and opening the circuit to the relay 73 by separating the contacts 77 and 79. The condensor 89 will cause the relay 73 to hold the armature in this position for a while. With the armature so held the meter 1 is connected between the line 76 and ground 70. The meter may now be read at the central reading station with apparatus to be later described. When direct current flows through the relay 73 in the reverse direction, i. e. from ground 84 through the relay 73, the choke 83, contacts 81, 80, 79, 77 and line 76 to the central station, the coil 93 will gain in magnetic power and the coil 92 will lose in power. This causes the armature to rotate counter-clockwise, thus making the contact 80 touch contact 71 and separate it from contact 81. The circuit to the relay 73 is opened, but the condensor 89 causes relay 73 to hold the armature in position for a while. With the armature so held the selector identifying resistance is connected between the line 76 and ground 70. The identifying resistance may be read at the central reading station with the apparatus in this position.

At the central reading station alternating current is rectified so that only the positive half-cycles remain. When these half-cycles are applied to the line 76 a pulsating current will flow from the central reading station over the line 76 through the contacts 77, 79, 80, 81, copper-oxide rectifier 85, resistor 86, relay 87 to ground 88. The rectified alternating current will not flow through the choke 83 because of the blocking action of the choke and will not, therefore, affect the polarized relay 73. This type of current will pass through the copper-oxide rectifier 85. Rectified alternating current composed of negative half-cycles will not pass through the rectifier 85, however. If direct current is sent over line 76 it will pass through the rectifier 85 only when it is of positive polarity. It is not effective to the relay 87, however, because of the reducing action of the resistor 86. The alternating current used is of higher potential than the direct current used in the system, therefore, the positive rectified alternating current will affect the relay 87 in spite of the reducing action of the resistor 86. When the relay 87 is energized by the positive half-cycles of alternating current it attracts an armature 95 to a contact 96 thus completing the circuit of the coil 63. As heretofore explained, when the coil 63 is energized it attracts armature 62 causing the pawl 61 to advance the automatic switches 56, 52, and once every ten times 51.

Figure 5:
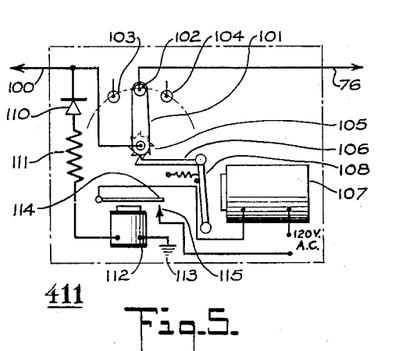
Figure 5 is a schematic electric diagrammatic view of the primary selector.

The line 76 is the only wire that goes to a primary selector 411, shown in Figure 5, ground being used to complete the circuit. The line 76 when being used is in contact with a line 100 by means of an arm 101 and a contact 102. Other contacts 103 and 104, etc., go to other secondary selectors. The arm 101 is advanced by means of a ratchet 105 and a pawl 106. The pawl is driven whenever a coil 107 is energized attracting an armature 108. When alternating current that has been rectified so that only the negative half-cycles remain is applied at the central reading station to line 100, the current will flow through a copper-oxide rectifier 110, a resistor 111, a relay 112, to a ground 113. This current will energize the relay 112, attracting an armature 114 to a contact 115. Thus the circuit of the coil 107 is closed energizing the coil 107 and thereby advancing the arm 101 to the next secondary selector line. Even though the other types of electricity attempt to affect the relay 112 the copper-oxide rectifier 110 and the resistor 111 reduce such attempts to non-active value. The rectifier 110 blocks the positive half-cycles of alternating current and the positive direct current used to work the secondary selector as explained before. Although the rectifier 110 will pass negative direct current the resistor 111 will reduce it to a non-active value. The resistor will also reduce the rectified alternating current needed to energize the relay 112. The value of the original alternating current is so high, however, that this reduction has no effect. The line 100, which is nothing more than an extension of line 76 goes directly to the central reading station apparatus 412, shown in Figure 9.

Figure 6:
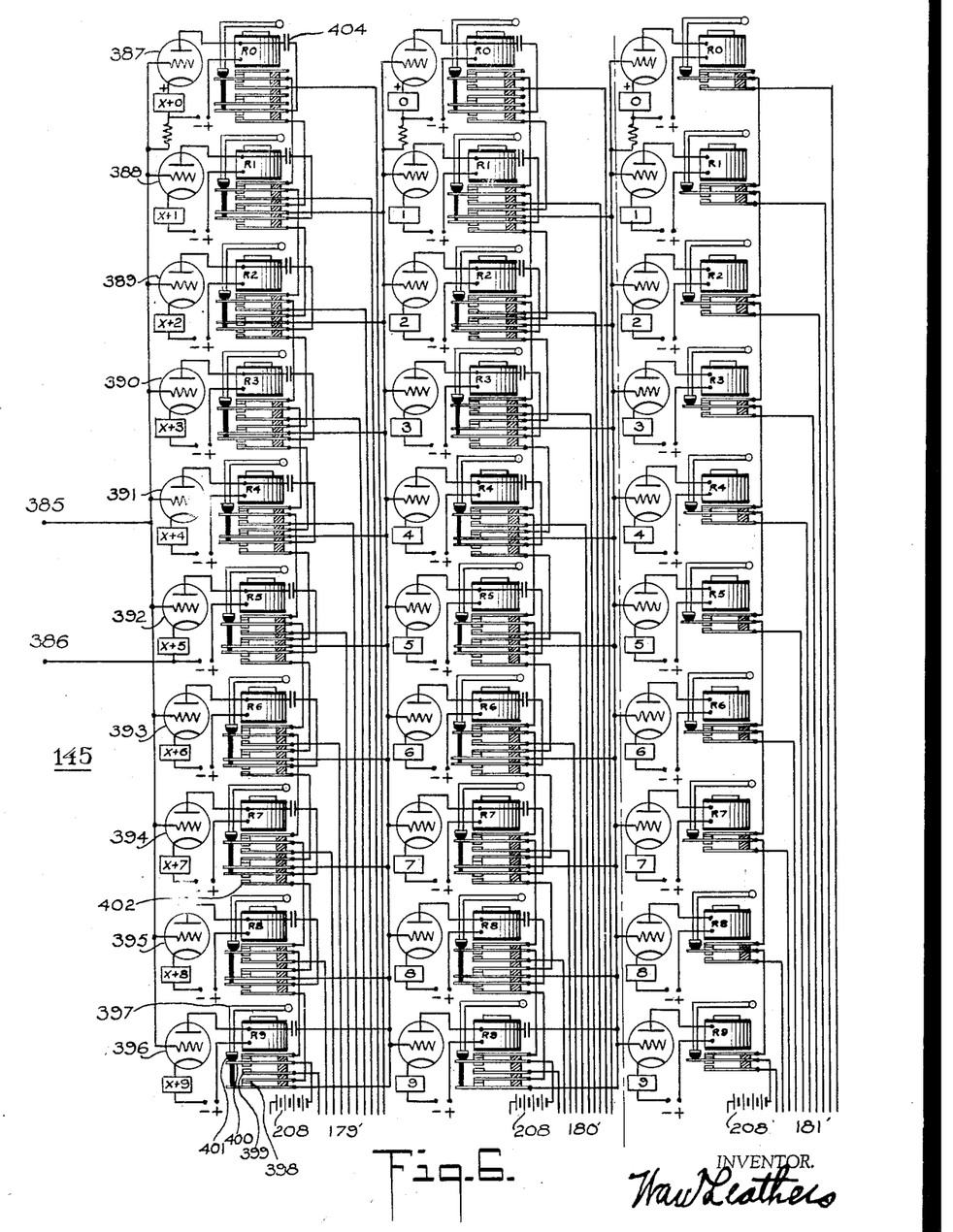
Figure 6 is an electrical diagram of the electronic discriminator in the central-station meter-reading equipment.
Figures 7, 7A, 8, 10:
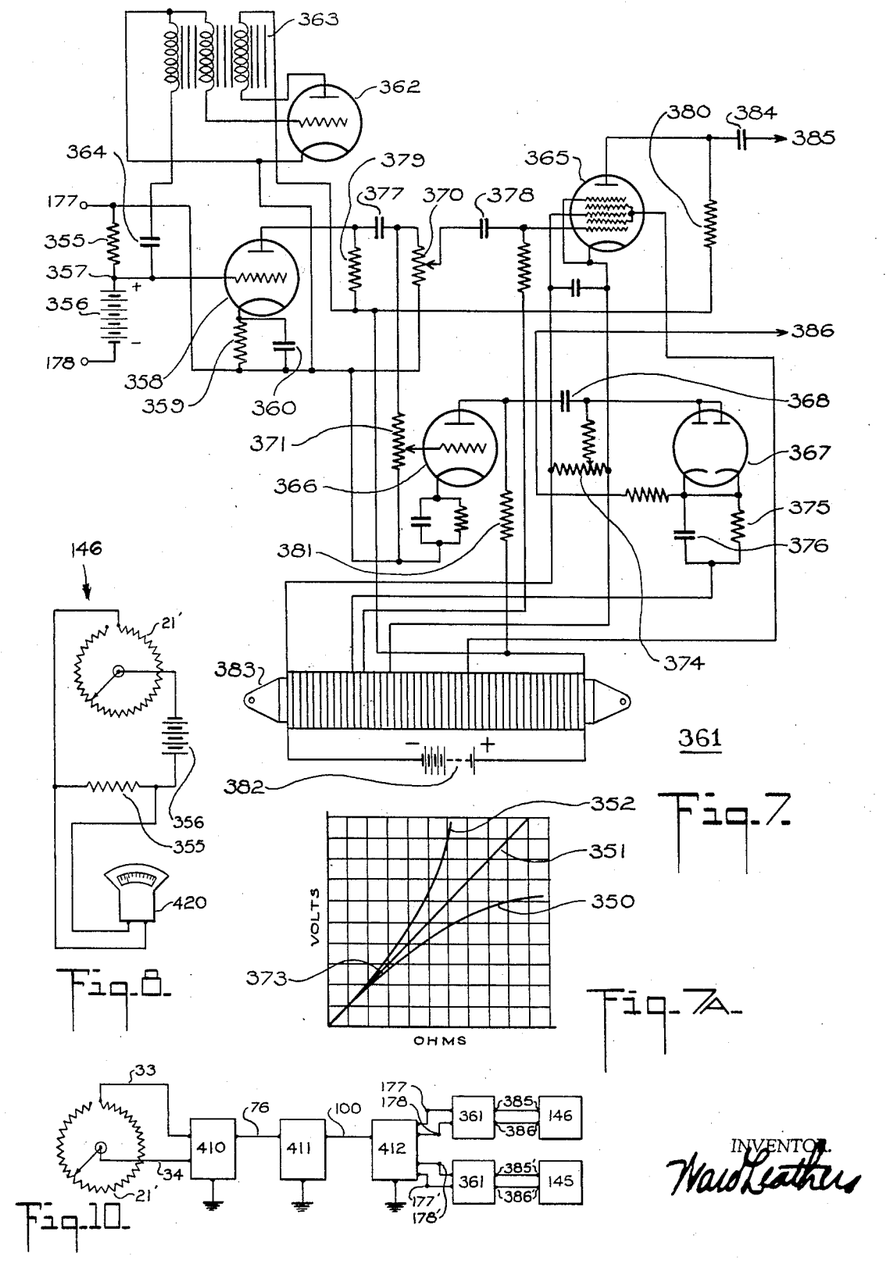
Figure 7 is a diagrammatic view of an electronic voltage amplifier and curve compensator employed in connection with the present invention.
Figure 7a is a diagrammatic view in the form of a voltage resistance graph employed for the purpose of illustrating the nature of the apparatus shown in Figure 7.
Figure 8 is an electrical diagram of a skeletonized and simplified meter-reading system.
Figure 10 is a block diagram of the entire meter-reading system.
Figure 9:
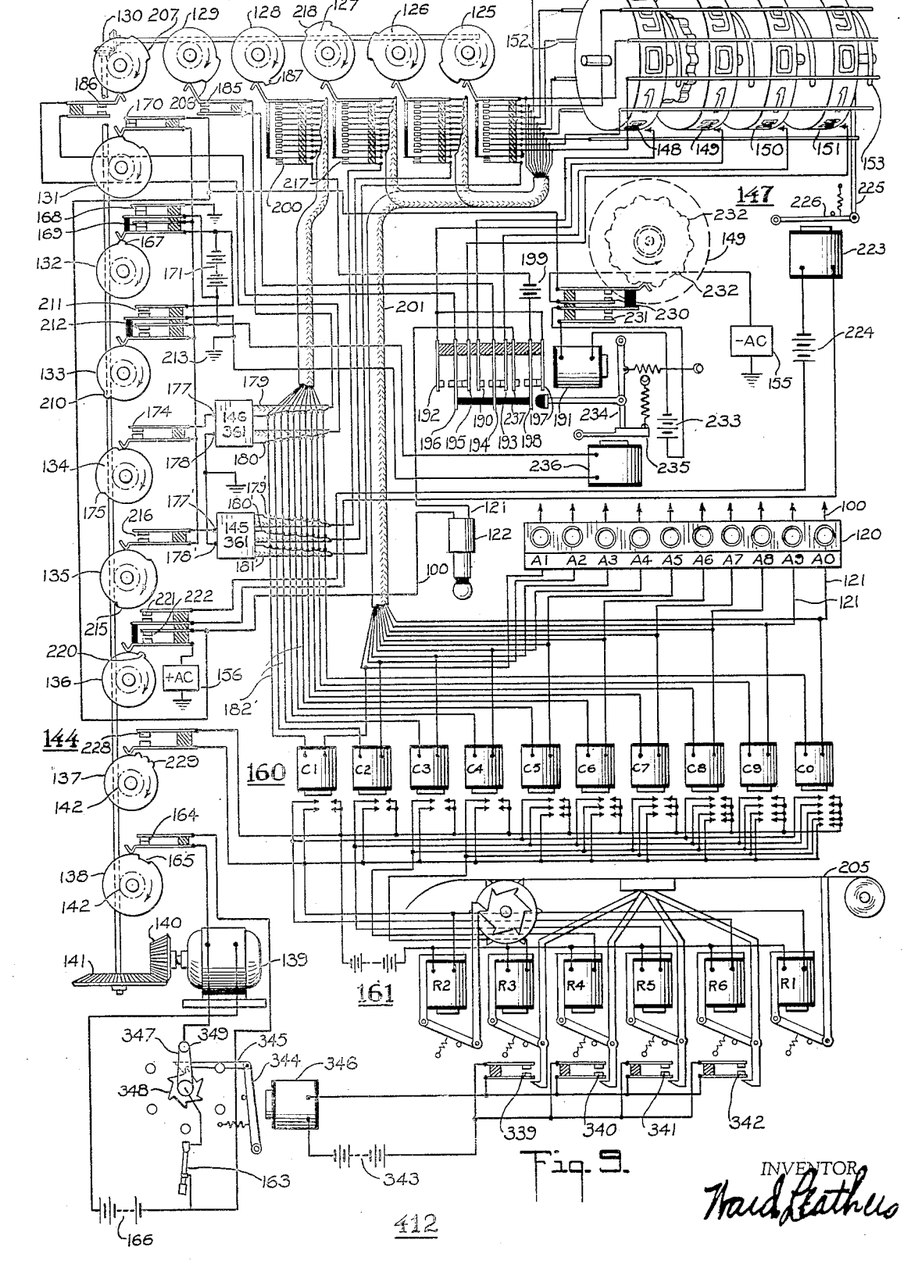
Figure 9 is a general electrical diagram of the central-station meter-reading and recording equipment.

In order to read the information transmitted by meters and selectors the reading mechanism requires a timing circuit which automatically sends out the necessary types of current over the line 100 at precisely the right time, a combination of vacuum tube circuits which changes the different resistance values obtained from meter-readings into proportionate voltage values and also compensates for non-uniform increases in voltages caused by uniform decreases in resistance values in the meters, and three series of vacuum tube circuits which take a voltage value represented by a figure of three digits, i. e. 3.45 volts, and break it down to a reading of 345 kilowatt hours, as shown in Figures 9, 7 and 6 respectively.

Provision is made for trunk lines 100 to ten primary selectors each. A jack strip 120 contains ten jacks labeled A0—A1—A9. These are two-wire jacks joined to the line 100 and conductor 121. When a plug 122 is inserted into one of the jacks the two circuits 100 and 121 are individually completed. Should more than ten primary selectors be needed additional jack strips similar to 120 are used and may be labeled B0—B1—B9, etc., as may be desired. Up to two hundred sixty primary selectors may be used for any one numerical series.

Automatic timing is accomplished by mechanism including a series of fourteen discs 125, 126, 127, 128, 129, 130, 131, 132, 133, 134, 135, 136, 137 and 138 which are rotated by means of a motor 139 and are generally characterized by the numeral 144. The speed of rotation of the motor as applied to the discs 144 is reduced by means of gears 140 and 141, as well as by worm gears 142. Each disc has indentations and projections on its circumference. The projections push electrical contacts together and the indentations allow these contacts to open. When the discs are rotated the electrical contacts are closed and opened on each disc in timed relation to one another. The identifying number of the meter is read first, then the indication of the meter. The indication of a meter is read by a discriminator shown diagrammatically at 145 in Figure 9 and shown in deatil in Figure 6. The identifying number of a meter is read by a similar discriminator diagrammatically shown at 146 in Figure 9, which breaks it down into three separate digits by means of the timer 144. The reading voltage value is broken down into three digits, the identifying value is broken down into only two digits. The reasons for this change of action will be set forth hereinafter.

The discriminators 145 and 146 are substantially identical in construction and operation with the exception that the former has incorporated therewith three sets of wires 179', 180' and 181' (Figure 6) and associated electronic elements designed for breaking the resistance established by the meter into three digits while the latter has incorporated therewith only two such sets of wires 179 and 180 (Figure 9) and associated electronic elements designed for breaking the meter-established resistance into two digits. It has been deemed unnecessary to illustrate the discriminator 146 in detail since its construction and operation will be readily understood from the disclosure in Figure 6 of the discriminator 145.

When a meter is about to be read, the timing mechanism 144 causes a step-by-step counting register, generally characterized by the numeral 147, to advance one position, as will be described presently. Thus, for example, when 350 meters have been read the figure 0350 will be evident on the register or counter consisting of a thousands number wheel 148, a hundreds wheel 149, a tens wheel 150 and a units wheel 151. By means of a set of ten electrical contactor bars 152 and a brush 153 on each wheel the number 0350 may be tapped off electrically. The wire going to the brush of the thousands wheel will make contact with electrical bar number 0; the brush on the hundreds wheel will make contact with bar number 3, and so forth. All meters are numbered consecutively and progressively. Thus, for example, when the counter 147 registers the number 5748 and primary selector A6 is used, the number of the secondary selector is 657, and the number of the meter is 748. When the meter identifying number is read, however, only the numerals 48 are read. The number 748 is recorded, however, because the counter 147 supplies the missing numeral. The counter also checks the number of the meter being read with the number that is registered. The two should be identical. If they are not, no number will be recorded, as will be later explained. The reading and recording of the identifying number of the secondary selector is done in exactly the same way except that the missing numeral is supplied by the jack strip 120 instead of the counter 147.

Every time one-hundred meters have been read the primary selector (Figure 5) must be advanced. An alternating current is rectified so that only the negative half-cycles remain. A train of these negative half-cycles is applied to line 100 every time the hundreds wheel 149 of the counter 147 advances one position. An alternating current generator and rectifier for producing the negative half-cycles of current is indicated by a box 155. Every time a meter has been completely read, the secondary selector (Figure 4) must be advanced one position. To facilitate this the timer sends a train of positive half-cycles of alternating current over the line 100. Apparatus for generating and rectifying alternating current to produce the positive half-cycles is indicated by a box 156.

A coder, generally characterized by the number 160, translates the ten circuits for digits 1—2—3—4—5—6—7—8—9—0 into a code consisting of one or a combination of identical marks or punched holes. For complete information on a code and punching process suitable for this purpose reference may be had to my above mentioned patent. A preferred means used for recording the information obtained by this reading system is a perforating unit generally characterized by the numeral 161. The code of four characters is perforated in a tape by electro-mechanical means.

To start the system running a switch 163 must be closed. If the switch 163 is closed and then opened before a meter-reading is complete, the system will finish reading that one meter and then automatically cease functioning. This is made possible by a contactor 164 on the disc 138. An indentation 165 in the circumference of the disc 138 will open the contactor 164 when the reading of a meter has been completed. The contactor 164 and the switch 163 are connected in parallel. If they are both open the motor will stop. If either one of them is closed the motor will run. The motor 139 is powered by a battery 166.

When the switch 163 has been closed and the discs, 125 to 138 inclusive, begin revolving, a projection 167 on the disc 132 closes contactors 168 and 169. Disc 131 closes contactor 170. A battery 171 sends a pulse of negative direct current over line 100. This pulse causes the armature 78 of relay 73 in Figure 4 to rotate counter-clockwise. As explained before, the identifying resistor for the meter 1 is not put across the circuit. By this time the discs have rotated further, causing a contactor 174 to be closed by a projection 175 on the disc 134. The discriminator 146, to be described more fully hereinafter, is now connected to the meter 1 at points 177 and 178. Leading from the discriminator 146 are two sets of wires, 179 and 180, ten wires and a common wire in each set. If the identifying number of the meter being read, for example, is 325, the common wire and the second wire of set 179 representing the numeral two will be shorted through a recording means, and the common wire and the fifth wire representing the numeral five of set 180 will be shorted together for recording purposes. The corresponding wires of each set of ten are joined together. The common wire of each set is, however, left single. The common wire of set 179 goes to a contactor 185 on the disc 129 and the common wire of set 178 goes to a contactor 186 on disc 130. Coming out of the discriminator 145 (see also Figure 9) are three sets of ten wires and a common to each, 179', 180' and 181' respectively. These are connected to the sets coming out of discriminator 146 in the manner described. The now ten wires 182' that are the junctions of fifty wires go to ten contacts controlled by the disc 128. These contacts are shorted together when a projection 187 on the circumference of the disc 128 comes into actuating position. Each of the ten wires 182' also goes to a coder relay C1, C2, C3, C4, C5, C6, C7, C8, C9 and C0 in the coder 160 and thus these wires constitute a selectively operable reading or recording circuit. After going through the relays on the coder the lines go to the jack strip 120, becoming lines 121. They also go to three sets of contactors on the discs 127, 126 and 125 respectively, and also go to the ten electrical contact bars 152 on the counter 147. The brush 153 on the thousands disc 148 is wired to a contact 190 on a switching assembly operated by a locking relay 191. The contact 190 is normally open. The brush 153 on the hundreds disc 149 is wired to a contact 192 on the switching assembly on relay 191. The contact 192 is normally open. The brush 153 on the tens disc 150 is wired to a contact 193 on the same switch assembly. The contact 193 is normally touching a contact 194 which goes to the second terminal of the contactor 185 on the disc 129. The brush 153 on the units disc 151 is wired to a contact 195 on the switching assembly of relay 191. The contact 195 is normally touching a contact 196 which is wired to the second terminal of contactor 186 on disc 130. The brush 153 on the hundreds disc 149 also goes to a contact 197 on the switch assembly of relay 191. The contact 197 is normally touching a contact 198 which is wired to a battery 199 and then to a contact 200 on the disc 128.

The same moment that the disc 134 causes the discriminator circuits in box 146 to function, the projection 187 on disc 128 makes contact 200 touch all of the ten wires from the discriminator 146. A circuit is now established from the battery 199 to contacts 198 and 197, to brush 153 on the hundreds disc 149, and, since the hypothetical number is 325 as aforementioned having three as its first digit, through the third electrical contact bar 152, by way of cable 201 and coder relay C3 to the contact 200, and thence back to the battery 199. The coder relay C3 thus supplied with energy closes two contacts causing three coils, R1, R2 and R5, in the perforator-recorder 161 to actuate. The numeral three is thus perforated in code on a tape 205, as is fully set forth in my copending application for Letters Patent, Serial No. 349,975. Immediately after the projection 187 on the disc 128 has revolved past its point of actuation a projection 206 on disc 129 closes contactor 185. A circuit is now established from battery 208 (see also Figure 6) in the common line of the set of wires 179 through the contactor 185, the contacts 194-193, to the brush 153 on tens disc 150, to the second electrical contact bar, through a wire in cable 201 to coder relay C2, to the second wire in the set of wires 179, all of which will become clearer when the electronic discriminator of Figure 6 is fully described and understood. The coder relay C2 will now cause punches R1, R2 and R4 to actuate, thus perforating the numeral two in code on the tape 205.

Now assuming the full hypothetical meter number to be A64325; the plug 122 is in jack A6 connecting the reading board to the primary selector A6, which is connected to secondary selector number 643, which in turn is connected to the meter number 325, now being read. Had the counter register 147 not indicated 4325, which is registered portion of the correct identifying number of the meter that should be being read, no numeral would have been recorded and the system would without seeming cause automatically stop, thus showing that the number of the meter being read is not the indicated number. No numeral would have been recorded because the brush on the tens disc 150 of the counter 147 did not try to actuate the same coder relay as the discriminator 146. Therefore no circuit was complete. It is in this way that the identifying numerals may be checked to make sure that the right meter is being read.

So far, two numerals have been perforated on the tape 205. The first numeral was chosen by the brush 153 on the hundreds disc 149. The second, as will be the third, was chosen by the discriminator and the position of the brush on the tens disc 150. The third numeral is perforated when a projection 207 on the disc 130 closes contactor 186. In this case the set of wires 180 and the units disc 151 are used for checking and recording.

After the third numeral is perforated a projection 210 on the disc 133 closes two contactors 211 and 212. A circuit is thus established from a ground 213 through contactor 211, to negative pole of the battery 171, from the positive pole through the contactor 212, through the contactor 170 on disc 131 to the line 100 on plug 122. Thus, a pulsation of positive direct current is sent over line 100. This causes the polarized relay 73 in Figure 4 to rotate clockwise connecting the resistance in meter 1 across the line 76 or 100 to ground. Now the actual consumption indication of the meter may be read.

The fourth numeral perforated is the first numeral of the consumption reading of the meter. It is obtained from the set of wires 179' on the discriminator 145. The fifth numeral from set of wires 180', and the sixth and last from 181'.

The motor 139 has by this time rotated the timer discs to the point where the disc 135 has, by means of a projection 215, closed a contactor 216. Closing the contactor 216 connects line 100 to juncture 177' on the discriminator 145. The reading of three digits is now possible by means of the three sets of wires. The common wire of the set of wires 179' is electrically connected to a contactor 217. When a projection 218 on the disc 127 closes the contactor, the common is then shorted to all of the ten wires in the cable 201. A circuit is thus established from one of the ten wires of set 179' to the corresponding coder relay, through the contactor 217 by way of the cable 201, to the battery 208 (Figure 6), and back to the mentioned wire in set 179'. One of the coder relays is thus energized closing circuits to the perforator 161. A coded numeral is then perforated. Disc 126 initiates the recording of the second numeral of the reading by means of the corresponding wire in set 180', and the disc 125 initiates the recording of the third and last numeral of the reading similarly in set 181'. The last two numerals are thereby read in exactly the same manner as the first.

After the last numeral has been recorded, the contactor 170 on disc 131 opens and the line 100 is disconnected from the reading apparatus. A projection 220 on disc 136 then closes a contactor 221 and a contactor 222. Contactor 222 when closed sends a train of positive half-cycles of alternating current over line 100 to the secondary selector shown in Figure 4. As heretofore explained, these half-cycles will advance the secondary selector to the next meter. When the contactor 221 is closed, an electro-magnet 223 is energized by means of a battery 224. A pawl 225 is pulled down by an armature 226, thus advancing the counter register 147 one position. The register now indicates the identifying number of the meter to be read next. Immediately after the contactors 221 and 222 are closed a contactor 228 is closed three times in succession by a series of three projections 229. Each time the contactor 228 is closed the tape 205 is advanced by the perforator 161. After the tape is advanced, the contactor 164 on disc 138 opens, thus stopping the system unless the switch 163 is closed.

Each time a new secondary selector is used (every hundredth reading) it must be identified and the number checked in the same manner as a meter is identified and checked. Therefore, each time the hundreds disc 149 on the counter register 147 advances one position two contactors 230 and 231 are closed by means of a projection 232. When the contactor 230 is closed it closes a circuit that sends a train of negative half-cycles of alternating current over line 100. As heretofore explained, these negative half-cycles of current advance the primary selector to the next local or secondary selector. When the contactor 231 closes, the locking relay 191 is energized by means of a battery 233. An armature 234 of the relay 191 is attracted and held in position by an armature 235 of a relay 236. The armature 234 when in locked position, throws contact 196 from contact 195 to contact 192; it throws contact 194 from contact 193 to contact 190 and throws contact 198 from contact 197 to contact 237. With the apparatus in this position the thousands wheel 148 and the hundreds wheel 149 do the checking of the identification numbers being read. The first numeral perforated is taken from the jack strip 120 instead of the hundreds wheel 194, as in the case of a meter-identifying number. The identification is otherwise the same as that of a meter.

Each time the perforator 161 records a numeral, one or more of four contacts 339, 340, 341 and 342 close, energizing an electro-magnet 346 by means of a battery 343. The electro-magnet 346 attracts an armature 344 thus pulling a pawl 345 which advances a contact arm 347 by means of a ratchet 348. The contact arm 347 has six positions. If every numeral of a meter identification and indication is perforated, the arm 347 will be back to a contact position 349. If less than six numerals are read then the arm 347 will stop before reaching contact position 349. Since the arm 347 and contact 349 constitute an automatic switch in series in a control circuit with the manual control switch 163 the system will automatically stop when the contactor 164 is opened. Thus, if in checking the identification of a meter or secondary selector a wrong numeral should be read, no numeral will be perforated, and the apparatus will cease functioning because the power circuit to the motor 139 is interrupted when contactor 164 opens. The operator's attention is thus demanded.

The two discriminators 145 and 146 are fundamentally the same. They are operated by different voltages, that is, every numeral from 000 to 999 has a definite exclusive individual voltage. When a voltage of 3.56 volts, for example, is impressed on the input of the discriminator, set 179' will read 3, set 180' will read 5, and set 181' will read 6. One thousand different values of resistance are produced by the meter 1. The amount of resistance from resistor 21' (Figure 1) in the circuit is dependent upon the registered consumption of the meter. The resistance introduced into the circuit causes the voltage across a fixed resistance 355 in Figure 7 in series with the meter resistance to change inversely. It is this voltage that is used to read the indication of the meter. The discriminator, in order to function correctly, must be actuated with various voltages that increase or decrease uniformly, but inverse voltage does not increase or decrease proportionally to the resistance introduced by the meter.

The problem and method of correction may be more clearly understood by referring to the graph of Figure 7a, wherein a voltage amplifier and curve compensator 361 is shown. A curve 350 is a typical example of uncompensated voltages and resistances. A curve 351 is the curve with which the discriminators function. A vacuum tube or secondary circuit as shown in Figure 7 changes the resistance values to voltage values and changes the voltage values so that they are uniformly increasing. The properties of the circuit are such that it does not amplify different voltages uniformly. In Figure 7a, a curve 352 represents the amplifying properties of the circuit. If a signal, such as is indicated by the curve 351, is fed to the circuit, the output would be expressed by a curve 352. If curve 350 expresses the input, then curve 351 represents the output. The slope of the curve 351 may be varied with changes in discriminator calibration. The actual operation of the circuit is as follows: The resistance 21' in the meter 1 is, in the process of reading, put across points 177 and 178. A circuit is then completed with a resistor 355 and a battery 356. A potential is produced across the resistor 355 at points 177 and 357. The amount of resistance across points 177 and 178 determines the voltage that is built up across points 177 and 357. The greater the resistance in the meter the smaller the voltage drop, the less the resistance, the greater the voltage drop. This voltage is impressed upon the grid of a vacuum tube 358. A resistor 359 and condensor 360 in the cathode circuit of the tube 358 gives the grid a negative bias with respect to the cathode. The voltage across the resistor 355 is applied to the tube 358 in such a way that the grid is made more positive when the voltage is increased. A tube 362 is used as an audio oscillator. A transformer 363 feeds energy from the output of the tube 362 to its input. This makes the circuit oscillate. The frequency of oscillation must be substantially constant but practically any frequency may be used. Any audio frequency is suitable. The oscillations are impressed upon the grid of the tube 358 by means of a condensor 364. Thus the output of tube 358 is a modulated audio frequency voltage modulated by the voltage drop across the resistor 355. As explained in previous text, uniform changes in the resistance in the meter 1 result in non-uniform changes in what is now a modulating voltage. Tube 365 is a voltage amplifier tube that amplifies all voltages the same. A tube 366 takes a portion of the output of the tube 358, amplifies it, then feeds it to the tube 367 through a condensor 368. The tube 367 rectifies the audio frequency current and uses the resultant direct current to bias the tube 365. The system is so wired that the greater the amplitude of the signal is the greater the amount of the amplification. Therefore, a signal that increases uniformly as shown by curve 351 in Figure 7a will be amplified more as it becomes greater and will look like curve 352 in the output. If the input is like curve 350 the output will be like curve 351. The slope of the output curve is determined by the amplitude of the signal fed to tube 365. A potentiometer 370 varies the amount of signal going to tube 365 and therefore controls the slope of the output curve. To change the amount of curvature introduced by these tubes, the amplitude of signal fed to the tube 366 must be regulated. This is done by means of a potentiometer 371. It is necessary to control the voltage at which the circuit begins to affect the amplification of the signal. If, as in Figure 7a, the voltage increases uniformly up to a voltage represented by a point 373 then the effective change in the circuit should begin at that point. If the circuit takes effect sooner on the uniformly increasing voltage, i. e. before point 373 the output will be a non-uniformly increasing voltage. To control the voltage at which the circuits begin functioning the tube 367 must be biased so that the signals fed to it by the tube 366 do not take effect until they are greater than and overcome the bias. The bias is controlled by a potentiometer 374. A resistor 375 and a condensor 376 are merely the standard diode detector combination used for smoothing out the rectified alternating current. Two condensors 377 and 378 are direct-current blocking condensors. Resistors 379, 380, 381 are plate-load resistors respectively for tubes 358, 365 and 366. The tubes are supplied with voltages by means of a battery 382 and a bleeder resistor 383. The output of this secondary circuit is in the form of a voltage that appears across two points 385 and 386. The condensor 384 is used to block the high voltage direct-current from the discriminator shown in Figure 6.

The purpose of the discriminator is to take a voltage such as 4.83 volts and close a relay corresponding to the hundreds digit 4, a relay corresponding to the tens digit 8, and a relay corresponding to the units digit 3. Thus, three relays will close, number 4 in set 179', number 8 in set 180', and number 3 in set number 181'. The number 483 is then recorded in the manner heretofore explained by the apparatus in Figure 9. The voltage across points 385 and 386 in Figure 6 and Figure 7 is applied to the grids of ten vacuum tubes 387, 388, 389, 390, 391, 392, 393, 394, 395, 396. Each tube has a negative bias on its grid. The voltage on the grid of each successive tube in the row is one volt more negative. Therefore, for example, if it is assumed that the tube 388 has a negative bias of $X+1$ then the next tube 389 will have a bias of $X+2$ volts. The value X is in reality the voltage that is gained in the curve corrector 361 shown in Figure 7. In the plate circuit of each tube is a relay R0 to R9. These relays are set to operate on the amount of plate current that flows when the grid bias is zero volts. If the grid bias is —9 volts and +9.1 volts is impressed upon the grid, the relay will close and a potential of one-tenth of a volt will be the remainder or the available input to be amplified. It is assumed for convenience that the amplification factor of each tube is ten. Therefore, the one-tenth of a volt becomes one volt in the plate circuit. If the original voltage were $X+7.15$ volts, the developed voltage output of the tube 394 would be 1.5 volts. The relay in the plate circuit is energized and an armature 397 on relay R7 is attracted. When armature 397 is attracted it opens a pair of contacts 398 (shown for convenience in connection with the tube 396 but also applicable to the other similar tubes) and shifts a contact 400 from a contact 401 to a contact 399. This connects the number seven line of set 179 to the battery 208. A pair of contacts 402 are also closed. Although eight relays in all are closed only one actuates the recorder. When contacts 401 and 400 separate the common is broken up to that particular relay. In other words, when relay R7 closes, it breaks the output circuit of R6, R6 breaks R5, etc. When contact 398 is opened the voltage developed across the previous relay is disconnected from the input to the next row of tubes. Thus, if relay 4 closes, the output voltage of relay three is disconnected. The output voltage of tube 389 is disconnected by relay R3, etc. The output voltage of each tube in the first column is applied to the grids of all the tubes in the next column through a blocking condensor 404. This is possible because audio frequency alternating current is used throughout the system.

The following example of the operation of this apparatus clearly expresses its functions and purposes. If the dial in meter 1 indicates a figure 632 then the voltage developed across points 385 and 386 will be $X+6.32$. The first seven relays, R0 to R6, in the first row, will close. Only relay R6 will have control because it breaks the circuits of R5, R5 breaks the circuits of R4, etc. A voltage of 3.2 volts is built up across the relay R6 and fed to the next row of tubes. Relay R0, R1, R2, and R3 in this row will close. The same process is repeated and a voltage of 2 volts is built up across relay R3 in the second row. This is fed to the third and last row of tubes and will close relays R0, R1 and R2 in this row. Thus in set 179 the sixth wire is connected to the battery 208. In set of wires 180 the third wire is connected to battery 208 and in set of wires 181 the second wire is connected to battery 208.

The only difference between discriminators 145 and 146, in Figure 9, is that discriminator 146 omits the third or last row of tubes and therefore has capacity for a figure of only two digits.

A simplified version of what the discriminator accomplishes is shown in Figure 8. The resistor 21 in the meter to be read is wired in series with a resistor 355 and a battery 356. Current from battery 356 flows through these resistors causing a voltage drop across each resistor. The voltage drop across one of two resistors in series across a battery is equal to $RE/R_1+R_2$ where R1 is the value of the first resistor in ohms, R2 of the second and E the voltage of the battery. The formula gives the voltage across R1. Resistor 21 may be likened to R2, resistor 355 to R1 and the battery 356 likened to E. If, therefore, the resistor 21 changes its resistance in direct relation to a measured value, a voltmeter 420, if calibrated correctly, will indicate the measured value by measuring the voltage drop across resistor 355. The voltmeter 420 is the simple version of the discriminator and the remainder of the diagram is the skeletonized reading circuit.

A block diagram of the entire meter-reading system is found in Figure 10. The meter resistor 21 is wired to the secondary selector 410 by means of lines 33 and 34. The secondary selector is wired to the primary selector 411 by means of line 76 and ground. The primary selector is wired to the timer 412 by means of line 100 and ground. The timer 412 is wired to a curve compensator 361 by lines 177 and 178 and thence to a two numeral discriminator 413 by lines 385 and 386. This method of connection facilitates the reading of the identifying number of the meter. To read the actual measured quantity indicated by a meter the timer is automatically connected to another curve compensator 361 by lines 177 and 178 and thence to a three numeral discriminator 413 by lines 385 and 386. Of course, more than one meter is connected to the secondary selector 410 and more than one secondary selector is connected to the primary selector 411. Since each primary selector facilitates the reading of 10,000 meters if a utility or reading company has more than 10,000 subscribers, more than one primary selector is used.

I wish it understood that the foregoing description pertains to one embodiment of my invention which obviously may be expressed in numberless forms and arrangements without departing from its spirit.

I claim:

1. In an apparatus for recording at a central station the indication of a meter located at a remote point, an impedance circuit, a variable resistance associated with the meter, means for introducing into the circuit portions of said resistance directly proportional to the meter reading and hence to the volume consumption of the metered product, a fixed resistance in said circuit in series with said variable resistance, means for energizing said circuit to create a voltage drop across said latter resistance which is non-linearly proportional to the impedance value of the portion of the variable resistance in the circuit, electronic means having an input circuit extending across said fixed resistance and having an output circuit, said electronic means including an energizing source and amplifying means for establishing in the output circuit voltages which are linearly proportional to the meter indication, and means for recording said current voltages.

2. In a meter reading apparatus for meters having a rotary dial indicator actuated by volume consumption of the metered product, a plurality of signaling resistances of progressively increasing values, each succeeding resistance being inclusive of the preceding resistances, an impedance circuit, means for successively connecting said resistances in the circuit in accordance with the advancing positions of the dial indicator, means in said circuit establishing a potential differential commensurate with the impedance value of the circuit, an amplification circuit, electronic means responsive to said potential differential for establishing in said amplification circuit voltages inversely proportional to said differential and of uniformly progressively increasing values, and means for recording said voltages.

3. In a telemetric system for indicating at a central station the position of an advancing meter dial indicator located at a remote point, a plurality of normally open reading circuits adapted to be selectively closed to render an indication of the dial indicator position, an electronic discriminating apparatus for selectively closing said circuits including a series of relays operable upon energization thereof to potentially close respective reading circuits, said relays being responsive only to voltages below respective predetermined uniformly and progressively increasing maximum voltages, a negatively biased electronic device for each relay including an output circuit operatively connected to the relay, means for impressing negative biases of uniformly and successively increasing voltages on said devices, an input circuit common to said devices, and means responsive to the movement of the dial indicator for applying voltages commensurate with the advancing position thereof to said input circuit.

4. In a telemetric system for indicating at a central station the position of an advancing meter dial indicator located at a remote point, a plurality of normally open reading circuits adapted to be selectively closed to render an indication of the dial indicator position, an electronic discriminating apparatus for selectively closing said circuits including a series of relays operable upon energization thereof to potentially close respective reading circuits, said relays being responsive only to voltages below respective predetermined uniformly and progressively increasing maximum voltages, a negatively biased electronic device for each relay including an output circuit operatively connected to the relay, means for impressing negative biases of uniformly and successively increasing voltages on said devices, an input circuit common to said devices, a second series of relays likewise normally operable upon energization thereof to potentially close respective reading circuits, a negatively biased electronic device for each of said latter relays including an output circuit operatively connected to the relay, means for impressing negative biases of uniformly and successively increasing voltages on said latter devices, said output circuits comprising a common input circuit for said latter devices, means including a blocking condenser operatively connecting said latter input circuit to each output circuit of the former electronic devices, and means responsive to the movement of the dial indicator for applying current voltages commensurate with the advancing position of said indicator to the former input circuit.

5. In a telemetric system for indicating at a central station the position of an advancing meter dial indicator located at a remote point, a plurality of normally open reading circuits adapted to be selectively closed to render an indication of the dial indicator position, an electronic discriminating apparatus for selectively closing said circuits including a series of relays operable upon energization thereof to potentially close respective reading circuits, said relays being responsive only to voltages below respective predetermined uniformly and progressively increasing maximum voltages, a negatively biased electronic device for each relay including an output circuit operatively connected to the relay, means for impressing negative biases of uniformly and successively increasing voltages on said devices, an input circuit common to said devices, a second series of relays likewise normally operable upon energization thereof to potentially close respective reading circuits, a negatively biased electronic device for each of said latter relays including an output circuit operatively connected to the relay, means for impressing negative biases of uniformly and successively increasing voltages on said latter devices, said output circuits comprising a common input circuit for said latter devices, means including a blocking condenser operatively connecting said latter input circuit to each output circuit of the former electronic devices, means responsive to the movement of the dial indicator for applying current voltages commensurate with the advancing position of said indicator to the former input circuit, and automatic timing mechanism for successively and separately closing the circuits which are potentially closed by each series of relays.

6. In a telemetric system for indicating at a central station the position of an advancing meter dial indicator located at a remote point, a plurality of normally open reading circuits adapted to be selectively closed to render an indication of the dial indicator position, an electronic discriminating device for selectively closing said circuits including a plurality of successively arranged series of relays operable upon energization thereof to potentially close respective reading circuits, the relays of each series being responsive only to voltages below respective predetermined uniformly and progressively increasing maximum voltages, a negatively biased energizing electronic device for each relay including an output circuit operatively connected to the relay, means for impressing negative biases of uniformly and successively increasing voltages on the devices of each series, an input circuit common to the devices of each series, means including a blocking condenser operatively connecting the input circuit of the electronic devices of successive series to each output circuit of a preceding series, and means responsive to the movement of the dial indicator for applying voltages commensurate with the advancing position of said dial indicator to the common input circuit of the electronic devices of the first series.

7. In a telemetric system for indicating at a central station the position of an advancing meter dial indicator located at a remote point, a plurality of normally open reading circuits adapted to be selectively closed to render an indication of the dial indicator position, an electronic discriminating device for selectively closing said circuits including a plurality of successively arranged series of relays operable upon energization thereof to potentially close respective reading circuits, the relays of each series being responsive only to voltages below respective predetermined uniformly and progressively increasing maximum voltages, a negatively biased energizing electronic device for each relay including an output circuit operatively connected to the relay, means for impressing negative biases of uniformly and successively increasing voltages on the devices of each series, an input circuit common to the devices of each series, means including a blocking condenser operatively connecting the input circuit of the electronic devices of successive series to each output circuit of a preceding series, means responsive to the movement of the dial indicator for applying voltages commensurate with the advancing position of said dial indicator to the common input circuit of the electronic devices of the first series, and automatic timing means for successively and separately closing the circuits which are potentially closed by each series of relays.

8. In a telemetric system for indicating in units, tens and hundreds digits of the Arabic numeral system at a central station the position of an advancing meter dial indicator located at a remote point, a series of ten normally open reading circuits each corresponding to one of the ten digits in said system and adapted to be selectively closed to render indications of the position of said dial indicator, an electronic discriminating device for selectively closing said circuits including a first, second and third series of ten relays each, the relays of each series being operable upon energization thereof to potentially close respective reading circuits, the relays of each series being responsive only to voltages below respective predetermined uniformly and progressively increasing maximum voltages, a negatively biased electronic device for energizing each relay including an output circuit operatively connected to the relay, means for impressing negative biases of uniformly and successively increasing voltages on the devices of each series, an input circuit common to the devices of each series, means including a blocking condenser operatively connecting the input circuit of the electronic devices of the third series to each output circuit of the second series, means including a blocking condenser operatively connecting the input circuit of the electronic devices of the second series to each output circuit of the first series, and means responsive to the movement of the dial indicator for applying voltages commensurate with the advancing position of the dial indicator to the common input circuit of the electronic devices of the first series.

9. In a telemetric system for indicating in units, tens and hundreds digits of the Arabic numeral system at a central station the position on an advancing meter dial indicator located at a remote point, a series of ten normally open reading circuits each corresponding to one of the ten digits in shaid system and adapted to be selectively closed to render indications of the position of said dial indicator, an electronic discriminating device for selectively closing said circuits including a first, second and third series of ten relays each, the relays of each series being operable upon energization thereof to potentially close respective reading circuits, the relays of each series being responsive only to voltages below respective predetermined uniformly and progressively increasing maximum voltages, a negatively biased electronic device for energizing each relay including an output circuit operatively connected to the relay, means for impressing negative biases of uniformly and successively increasing voltages on the devices of each series, an input circuit common to the devices of each series, means including a blocking condenser operatively connecting the input circuit of the electronic devices of the third series to each output circuit of the second series, means including a blocking condenser operatively connecting the input circuit of the electronic devices of the second series to each output circuit of the first series, means responsive to the movement of the dial indicator for applying voltages commensurate with the advancing position of the dial indicator to the common input circuit of the electronic devices of the first series, and automatic timing mechanism for successively and separately closing the circuits which are potentially closed by each series of relays.

10. In a meter reading apparatus for successively indicating at a central station the identity and indication of a plurality of meters located at remote points, a secondary location, an impedance circuit leading from each meter to the secondary location, a reading circuit leading from the secondary location to the central station, a variable resistance associated with each meter, means for connecting varying increments of said resistance in its respective impedance circuit in accordance with the meter reading, a plurality of identifying resistances disposed at the secondary location each corresponding to a particular meter identity, certain of said resistances being inclusive of others thereof, a step-by-step selecting mechanism for separately and successively potentially connecting said impedance circuits to the reading circuit, a step-by-step selecting mechanism for separately and successively connecting said identifying resistances to the reading circuit, means synchronizing the movements of said step-by-step mechanisms whereby increments of corresponding variable resistances and identifying resistances are simultaneously potentially connected to the reading circuit, a relay actuated switch for selectively connecting selected impedance circuits and identifying resistances to the reading circuit, a relay therefor connected in the reading circuit, and means at the central station for applying actuating impulses to the relay circuit to actuate the relay.

11. In a meter reading apparatus for successively indicating at a central station the identity and indication of a plurality of meters located at remote points, a secondary location, an impedance circuit leading from each meter to the secondary location, a reading circuit leading from the secondary location to the central station, a variable resistance associated with each meter, means for connecting varying increments of said resistance in its respective impedance circuit in accordance with the meter reading, a plurality of identifying resistances disposed at the secondary location each corresponding to a particular meter identity, certain of said resistances being inclusive of others thereof, a step-by-step selecting mechanism for separately and successively potentially connecting said impedance circuits to the reading circuit, a step-by-step selecting mechanism for separately and successively connecting said identifying resistances to the reading circuit, means synchronizing the movements of said step-by-step mechanisms whereby increments of corresponding variable resistances and identifying resistances are simultaneously potentially connected to the reading circuit, a magnetically-actuated switch for alternately connecting selected impedance circuits and identifying resistances to the reading circuit, an electro-magnet for attracting said switch to actuate the same, said magnet being responsive to current of one polarity to move the switch to one position and to current of the opposite polarity to move the switch to its other position, means connecting the electro-magnet in the reading circuit, and automatic timing mechanism at the central station for periodically applying current of opposite polarity to the reading circuit to energize the electro-magnet.

12. In a meter reading apparatus for successively indicating at a central station the identity and indication of a plurality of meters located at remote points, a secondary location, an impedance circuit leading from each meter to the secondary location, a reading circuit leading from the secondary location to the central station, a variable resistance associated with each meter, means for connecting varying increments of said resistance in its respective impedance circuit in accordance with the meter reading, a plurality of identifying resistances disposed at the secondary location each corresponding to a particular meter identity, certain of said resistances being inclusive of others thereof, a step-by-step selecting mechanism for separately and successively potentially connecting said impedance circuits to the reading circuit, a step-by-step selecting mechanism for separately and successively connecting said identifying resistances to the reading circuit, a solenoid connected in the reading circuit for actuating said step-by-step mechanisms in unison whereby increments of corresponding variable resistances and identifying resistances are simultaneously potentially connected to the reading circuit, said solenoid being responsive only to the application of current impulses of a selected character, a magnetically-actuated switch for alternately connecting selected impedance circuits and identifying resistances to the reading circuit, an electro-magnet in the reading circuit for attracting said switch to actuate the same, said magnet being responsive only to current impulses of a character different from the other selected character for moving the switch to one position and being responsive only to current impulses of a character different from either of the other current impulses for moving the switch to its other position, and automatic timing means for periodically and successively applying current impulses of the various selected characters to the reading circuit.

13. In an automatic meter reading apparatus, a central station, a plurality of outlying meter locations, a signaling circuit connecting each meter location with the central station, a recording circuit at the central station common to the signaling circuits, selecting means for successively and separately connecting the recording circuit to said signaling circuits, a recording device connected in the recording circuit, means for applying successive series of a predetermined number of impulses each to the connected circuits to successively actuate the recording device a commensurate number of times in rendering successive single meter records, said impulse applying means including a control circuit, a step-by-step switch in said control circuit movable through a number of positions corresponding to the number of applied impulses in each series, said positions including a single closed position, a plurality of open positions, and a manually operable switch in said control circuit in series with the step-by-step switch, and means for indexing said step-by-step switch upon application of each impulse to said connected circuits.

14. In a meter reading apparatus for successively indicating at a central station the identity and indication of a plurality of meters located at remote points, a secondary location, a reading circuit extending between the secondary location and each meter, a reading circuit extending between the secondary location and the central station impulse-actuated step-by-step selecting means at the secondary location for separately and successively connecting each meter to the central station through said reading circuits, recording means at the central station for recording the identity and indication of a selecting meter, impulse-actuated indicating means at the central station for indicating the identity of a selecting meter, and timing mechanism at the central station for simultaneously indicating the impulse-actuated selecting and indicating means.

15. In a meter reading apparatus for successively indicating at a central station the identity and indication of a plurality of meters located at remote points and arranged in groups, a primary location, a plurality of secondary locations, a reading circuit extending between each secondary location and each meter of a group, a reading circuit extending between the primary location and each secondary location, a reading circuit extending between the primary location and the central station, impulse-actuated step-by-step selecting means at each secondary location for separately and successively connecting each meter of its respective group to the primary location through said circuits, impulse-actuated step-by-step selecting mechanism at the primary location for separately and successively connecting each secondary location to the central station through said circuits, recording means at the central station for recording the identity and indication of a selected secondary location and of a selected meter impulse-actuated indicating means at the central station for indicating the identity of a selected secondary location and of the selected meter, and timing mechanism at the central station for actuating the impulse-actuated selecting and indicating means.

16. In a telemetering system for indicating at a remote point the volume consumption of a metered product, a reading circuit, means for applying current at a predetermined potential to said circuit, a resistance, means for progressively introducing increments of said resistance into said circuit which collectively are commensurate with the consumed volume of the metered product to thereby create in said circuit voltages which are inversely and non-uniformly proportional to the collective increments of resistance introduced into the circuit, means for amplifying said voltages and rendering them uniformly and progressively increasing, means for selecting an amplifying voltage corresponding to the consumed volume of the metered product at the time of reading thereof, and means for recording said selected voltage in numerical terms representing the volume consumption of the product.

WARD LEATHERS.